United States Patent Office 3,194,679
Patented July 13, 1965

3,194,679
POLYESTER COATINGS
Arthur P. Dowling, Lakewood, Ohio, assignor to The Glidden Company, Cleveland, Ohio, a corporation of Ohio
No Drawing. Filed Mar. 24, 1960, Ser. No. 17,270
5 Claims. (Cl. 117—72)

This application is a continuation-in-part of my U.S. patent application Serial No. 663,600.

This invention relates to an improved polyester coating system, to process for applying same to a surface, and more particularly to such system and process wherein a polyester-containing coating material is allowed to set by the action of a peroxide catalyst contained in a layer thereunder.

Heretofore, peroxide catalysts have been incorporated directly into the polyester coating. The rapidity of curing after the catalyst is added limits the working life or "pot life" of the polyester. To eliminate this problem it has been proposed that the peroxide catalyst be incorporated into a solvent-cut lacquer subcoat, e.g. nitrocellulose, which is first applied to the surface to be coated, then dried by evaporation of solvent. The uncatalyzed polyester is applied thereover whereby cure of the polyester thus is effected. Accordingly, the pot life of the polyester resin applied is indefinite. Such technique is disclosed in my copending U.S. Patent application Serial No. 663,600, filed on June 5, 1957.

The instant invention has the same advantage concerning extension of pot life. It has the additional advantage over prior art lacquer techniques of employing little or no organic solvent. This substantially reduces fire hazard, objectionable odors and expensive solvent loss.

It has the further advantage over the use of catalyzed lacquer subcoats of better adhesion to a substrate and of permitting a higher proportion of resin solids to be applied in a given volume of catalyzed subcoating. Consequently, much higher loadings of inert solids can be used without the subcoating becoming crumbly or otherwise losing structural integrity. This permits formulation of subcoatings which are excellent for filling a porous or rough surface with a single application, e.g. in masonry surfaces. Application of the novel catalyzed subcoating of my invention can be done in conventional manner, e.g. by brush, gun, roller, or trowel. If desired, the polyester can be applied over the subcoating as soon as the subcoating has been laid down.

Broadly, in a process for coating a surface with a coating material comprising an unsaturated polyester dissolved in a polymerizable monomer, my improvement comprises applying to said surface an aqueous emulsion subcoating containing a synthetic resin comprising vinyl acetate units, having monomer solubility not substantially in excess of about 50%, and bearing a free radical catalyst capable of curing said polyester-containing coating material; thereafter applying said polyester-containing coating material directly over said subcoating; and allowing said coating material to set by the action of said catalyst in said subcoating.

My coating system for surfaces comprises a subcoating thereon of said polyvinyl synthetic resin solids deposited from an aqueous emulsion thereof and bearing a free radical catalyst capable of curing the coating material applied thereover, the coating material for application thereover comprising an unsaturated polyester dissolved in a polymerizable monomer.

As the subcoating of my invention is especially suitable for coating porous or rough masonry substrates, an additional aspect of my invention is a masonry article comprising a substrate of hardened masonry substance, an exterior coating material comprising an unsaturated polyester dissolved in a polymerizable monomer and, interposed between said exterior coating and said substrate, a subcoating containing inert solid filler and the aforesaid polyvinyl synthetic resin solids deposited from an aqueous emulsion thereof, said resin solids bearing a free radical catalyst capable of curing said exterior coating.

The aqueous emulsion subcoating of my invention can be made to dry extremely rapidly under ordinary conditions. Generally the user is instructed to let the subcoating dry for 4 to 48 hours before applying a polyester thereover. A free radical catalyst such as a peroxide catalyst can remain active for at least a week or longer when my emulsion subcoating is in either a wet or a dry state. If the polyester topcoating is applied before the subcoating is ostensibly dry to the touch, the only noticeable effect I have observed is that the polyester takes a longer time to cure to maximum hardness.

Application of the subcoating in freezing weather also retards the cure of the polyester although it otherwise does not appear to be deleterious to the resulting protective or decorative coating system. Film thicknesses of polyester over my subcoating commonly are about 10 to 20 mils, and I have made successfully hard polyester films of about 60 mils and thicker in the practice of my invention using a single application of polyester. While it is usually sufficient to apply a single subcoating and a single polyester topcoating in the practice of my invention, it is also possible to apply a series of alternating subcoatings and polyester coatings one on another in accordance with the precepts of this invention. Of course it is also possible to coat over the external polyester layer with an additional conventionally catalyzed polyester film.

Because of the very high polyvinyl resin solids that I can incorporate into my subcoatings, e.g. 20–60% by weight, I can load such subcoatings with as much as 20–200% of an inert filler based on the initial volume of the emulsion and maintain structural integrity without crumbliness or other undesirable structural defect. This is, of course, particularly good for smoothing over rough surfaces such as concrete block, brick, plaster, stone, and the like which are otherwise difficult to paint. If desired, after the application of such filled subcoating by brush or trowel, some of the damp subcoating emulsion can be scraped off the surface with a tool such as a rubber squeegee, thereby leaving the pores filled and only a thin emulsion layer on the high spots.

Because free alkaline impurities such as alkaline earth metal oxides and hydroxides and alkali metal hydroxides, as well as active (e.g. free) transition element oxides such as those of iron, manganese, chromium, vanadium, cobalt and the like tend to accelerate destruction of the peroxide catalyst in the subcoating, it is especially desirable to use inert fillers which have not more than about 1% of such impurities in them in order to get a reasonably long working life of the catalyst in the subcoat. By transition elements I mean those so designated in the Bohr arrangement of chemical elements that can change in valence. Silicates of iron, etc. do not appear especially active. In some instances the incorporation of a chelating agent such as ethylene diamine tetraacetic acid, gluconic acid, tartaric acid, salts thereof, etc. can be helpful for prolonging the catalytic activity of the filled emulsion subcoating.

The preferred inert filler is silica sand containing not substantially more than about ½% of iron measured as $Fe_2O_3$. Advantageously it is used in a proportion of about 80–120% based on the initial volume of the emulsion subcoating, and preferably in a proportion of about 100% on the same basis. Other suitable inert fillers that I can employ include talc, mica, asbestos, walnut shell flour, "Microballoons" (minute spheres of fully cured C-stage phenolic resin), calcium carbonate, alumina, wood flour, gypsum, barytes, blanc fixe, inorganic pigments, inert-coated metal particles, low-iron pumice or bauxite, and zeolites such as calcium, sodium, alumino silicates, especially those having molecular sieve properties.

The use of fillers reduces shrinkage of the subcoating, and those that do not retain much unbound water are superior. The principal offending impurities in most fillers are iron; I have found, for example, that an ordinary grade of untreated pumice is unsatisfactory for my purpose because the catalyst compounded therewith decomposes so rapidly that the subcoat is virtually ineffective for curing a subsequent polyester topcoating applied a few hours later. Similarly, carbon black as a filler can do the same thing, although less active grades of carbon, e.g. virtually ashless coke can be tolerated.

Polyvinyl resin emulsions provide a subcoating having good adhesion to ordinary substrates, e.g. concrete block, plaster, wood, hardboard, old painted surfaces, metal, and the like—usually much better than conventional lacquers. However, a most important criterion for the polyvinyl resin in the emulsion is that it have balanced solvent resistance to the polyester topcoating. As the unsaturated polyester resin is dissolved in a polymerizable monomer having powerful solvent properties, e.g. styrene or other similar aromatic compound, I have found it necessary to limit the suitable polyvinyl synthetic resins in the subcoating to those having monomer solubility not substantially in excess of about 50% and advantageously about 35%. This effectively suppresses any manifest tendency towards wrinkling of the eventual composite protective coating system and/or causing poor cure of the polyester. Presumptively, these phenomena are associated with migration of polyvinyl resin solute into the polyester coating thereover.

Monomer solubility for a particular polyvinyl synthetic resin (including plasticizer if present) can be determined by the following procedure: six grams of dried (100–120° F.) polymer particles in a foraminous thimble blocked with cotton is mounted in a Soxhlet extractor. The sample extracted for 8 hours with toluene, using 50 ml. more than is necessary for maintaining a siphoning in the extractor. The resulting toluene-resin solution is then removed from the extractor and the solvent evaporated off gently. Monomer solubility is the quotient of 100 times the recovered resin solute divided by 6. (If the polyvinyl resin is obtained initially in the form of an emulsion, it is reduced to dried form prior to extraction, e.g. by drying overnight at 30° C. in a forced air oven.)

An advantageous emulsion subcoating (filler-free basis) for my purposes contains about 20–60% by weight of polyvinyl acetate homopolymer solids having monomer solubility not substantially in excess of about 35%. Preferably the emulsion (on the same basis) contains about 40–60% by weight of such solids having monomer solubility not substantially in excess of about 30%.

In general, the higher the molecular weight of the polyvinyl resin, the lower its monomer solubility—although the degree of crosslinking of the polymer appears to exert a greater effect on its monomer solubility. Thus, for example, a polyvinyl synthetic resin having a molecular weight as low as about 30,000, but highly cross-linked, can be suitable for the purposes of my invention while one having a molecular weight as high as 80,000 can be unsuitable if substantially linear.

Many polyvinyl synethetic resins having molecular weight as high as several hundred thousand are generally available, and these can be suitable for my purpose. Thus, for example, instead of polyvinyl acetate homopolymers, I can use copolymers of vinyl chloride-vinyl acetates and vinyl acetate-acrylonitrile—providing they have monomer solubility not substantially in excess of about 50%.

The last-mentioned copolymer has especially good adhesion to metal substrates and can be used in my coating system advantageously without inert filler in many such applications. If the polyvinyl resin contains a fugitive plasticizer such as dibutyl phthalate or the like, this must be reckoned with as an element of monomer solubility, i.e. the fraction of such migratory plasticizer should be considered broadly as a soluble portion of the resin contributing towards its monomer solubility.

In general the suitable polyvinyl synthetic resin solids are made by emulsion polymerization, and quite frequently they are sold in the form of an aqueous emulsion containing 30–60% resin solids, about ½–2% of a conventional anionic or other surfactant to maintain their good dispersion, 1–3% of a protective colloid material such as hydroxy ethyl cellulose or polyvinyl alcohol, and the balance water. The presence of the protective colloid appears to be quite important for reducing monomer solubility of the polyvinyl synthetic resin, but it is not necessary in every instance.

The free radical catalysts which are suitable for my purposes are generally and preferably peroxides and hydroperoxides including methyl ethyl ketone peroxide, suitable in solution in a high boiling solvent such as dimethyl phthalate, cyclohexanone peroxide, e.g. that ordinarily sold as a concentrated solution in a suitable plasticizer or in a water dispersion, tertiary butyl hydroperoxide, and hydrogen peroxide, available in aqueous or organic solvent solution. Some migration of the peroxide catalyst into the polyester film appears to be necessary; I have found unpromoted benzoyl peroxide to be decidedly inferior to the foregoing ones for my purpose, but when promoted with a dialkyl aniline such as dimethyl aniline or diethyl aniline it is satisfactory. In such instance the emulsion subcoating can contain the peroxide and the polyester carry the promoter.

Suitable polyester resins for practice of this invention contain ethylenic unsaturation and ordinarily are made by condensing one or more unsaturated organic acids with one or more polyhydric alcohols. The polyester resin is dissolved in a cross-linking agent, for example styrene, divinyl benzene, vinyl toluene, a diallyl ester such as diallyl phthalate or the like. The polyester-polymerizable monomer compositions, which are substantially 100% polymerizable, are conventionally stabilized with inhibitors, e.g. phenolic inhibitors, to enable their being stored for extended periods. Certain of them also have incorporated therein a small amount of paraffin wax or the like to prevent air from inhibiting their cure. Others, notably those of the type shown in U.S. Patent 2,852,487, are not inhibited by contact with air. The polyester-containing coating art is well developed; it is shown at length in my co-pending U.S. patent application Ser. No. 663,600, which is incorporated expressly by reference herein.

Ordinarily the subcoating of my invention is pigmented white for commercial appeal, although many other tinting and pigmenting tones can be achieved in conventional manner if desired. Generally, also, the polyester topcoating for use in my process is pigmented in such a manner as to mask the red cast imparted to such polyester when it contains a conventional cobalt drier. Pigmenting the polyester topcoating usually involves the incorporation of white pigments such as titanium dioxide into the polyester-containing coating although clear polyester topcoatings can be used satisfactorily in my coating system. The polyester-containing coating also can have a conventional thixotropic agent in it, e.g. fine silica such as "Cab-o-Sil" or the like, the castor oil derivative "Thixcin," etc.

All parts are parts by weight, and all percentages are weight perecentages unless otherwise expressly indicated. Temperatures given are in degrees Fahrenheit.

The semi-gloss polyester enamel used in exemplary preparations was formulated by mixing the following components in the proportions indicated.

| | |
|---|---|
| Pulverized mica | lbs__ 0.75 |
| Pulverized magnesium silicate | lbs__ 0.75 |
| Silica gel thixotropic agent | lbs__ 0.19 |
| Titania pigment concentrate [1] | lbs__ 2.5 |
| Polyester resin in styrene [2] | pints__ 5.5 |
| Rubber grade styrene | do____ 1 |
| Odor masking agent [3] | liq. oz__ 1/8 |
| Cobalt curing promoter [4] | liq. oz__ 1/2 |
| Wax surfacing agent [5] | liq. oz__ 5 |

[1] Compounded of 12 lbs. of pigmentary rutile titania and 8 pts. of the following vehicle:
The reaction product of 1.13 mols of propylene glycol, 0.5 mol of maleic anhydride, and 0.5 mol of phthalic anhydride cooked to a maximum temperature of 375° F. in xylene solvent with $CO_2$ stripping, stripped under reduced pressure to 100% solids, then blended with diallyl phthalate monomer, 4 tertiary butyl catechol stabilizer, and acetamidine hydrochloride stabilizer to give a solution containing 50% of the monomer, 0.01% of the catechol stabilizer, and 0.25% of the acetamidine stabilizer. The acetamidine stabilizer was a solution of one part of acetamidine hydrochloride in 4 parts of propylene glycol.
[2] Compounded of the reaction product of 1.21 mols of propylene glycol, 0.66 mol of isophthalic acid, and 0.34 mol of maleic anhydride which had been cooked to a maximum temperature of 425° F. while stripping with inert gas, then cut back with 0.43 part (per part of resin) of rubber grade styrene inhibited with 0.05% of hydroquinone (on a total mixture basis), further cooked under reduced pressure, with rectification of the kettle vapors and a maximum kettle temperature of 400° F., to obtain a resin having Gardner-Holdt viscosity of X to Y and an acid number of 25±2, and finally additionally inhibited with an extra 0.05% of hydroquinone.
[3] Prepared by mixing a gallon of conventional industrial odorant (No. 18301 of Fritzsche Brothers, Inc., New York, N.Y.) with 9 gallons of rubber grade styrene.
[4] Cobalt octoate, 12% in a solution of 50% butanol and 50% xylene.
[5] Compounded in the proportion of 2.5 oz. of paraffin wax (123-125° F. M.P.) in 8 pints of rubber grade styrene.

The gloss polyester enamel used in exemplary preparations was formulated by mixing the following components in the proportions indicated (prior to application over subcoating there is added to this enamel 0.5 oz. per gallon of the cobalt curing promoter shown above in connection with the semi-gloss enamel):

| | |
|---|---|
| Rubber grade styrene | pts__ 1 |
| Titania pigment concentrate [1] | lbs__ 2.5 |
| Silica gel thixotropic agent | lbs__ 0.31 |
| Polyester resin [2] | pts__ 7 |

[1] Composition given above in connection with semigloss enamel.
[2] Compounded of the reaction product of 0.88 mol of propylene glycol, 0.5 mol of succinic anhydride, 0.5 mol of maleic anhydride, and 0.25 mol of the mixed mono-, di-, and triallyl ethers of pentaerythritol (analytically averaging the pure diallyl ether of pentaerythritol and having an 11% hydroxyl content, iodine number of 240, and ash, as sulfate, of 0.18%) which had been cooked in the presence of nitrogen gas and 1% tricresyl phosphate to a maximum temperature of 365° with entrainment of water by xylene solvent, then stripped of solvent with nitrogen gas, cut back with 0.43 part of rubber grade styrene per part of resulting polyester resin, and inhibited (basis polyester resin) with 0.01% p-benzoquinone and 0.25% of a 20% solution of acetamidine hydrochloride in propylene glycol. Viscosity of the resulting mixture was P-R (Gardner-Holdt), acid number 40±3, polyester content of 69%±1, and weight per gallon of 9.14 lbs.

Example 1

788.3 parts of an aqueous dispersion of polyvinyl acetate homopolymer solids, 56% non-volatile solids of 1 micron mean particle size in water, the homopolymer having monomer solubility of 26.5% and an estimated molecular weight of its toluene-soluble portion in excess of 100,000, said dispersion having viscosity in the range of 900-1200 centipoises, pH of 4-6, and density of 9.25 lbs. per gallon, were mixed mechanically with 83 parts of pigmentary rutile titania, 21 parts of pulverulent white clay, 24 parts of a 2% aqueous solution of methyl cellulose (viscosity 4,000 centipoises) for thickening, 28 parts of water, 1.04 parts of nonyl phenoxy polyoxyethylene ethanol containing between 9 and 10 mols of ethylene oxide equivalent per mol of alkylated phenol as a surfactant, 1.04 parts of dioctyl sulfosuccinate as a surfactant, and 0.42 part of 2-ethyl hexanol as a defoaming agent. The resulting emulsion had viscosity of about 2150 centipoises at 78°, 9.46 lbs. per gallon density, and 56% non-volatile material.

To a portion of this emulsion there was added an equal volume of wet ground silica sand having particle size between about 50 and 140 mesh (U.S. Standard Sieve size) and 0.04-0.047% iron measured as ferric oxide. Then a peroxide catalyst, methyl ethyl ketone peroxide, a 60% solution in dimethyl phthalate vehicle, was blended into the filled emulsion in the proportion of 4 liquid oz. per gallon of the filled emulsion.

The filled and catalyzed emulsion was brushed onto porous concrete block surface and allowed to dry at room temperature for 4 hours, the resulting moisture content then being less than 10%. In this manner the pores of the concrete block were filled, and a smooth, white surface was presented for receiving polyester topcoating.

Example 2

The semigloss polyester enamel was applied by brush to the concrete block coated as described in Example 1 to give a polyester film thickness between 10 and 20 mils.

The polyester was allowed to cure overnight at 70-75° to a hard tack-free film that could not be scratched by fingernail. It reached maximum hardness in about one week and resembled a ceramic coating on the block.

By way of contrast a similar emulsion subcoating to that of Example 1, except that it was formulated with polyvinyl acetate homopolymer solids having monomer solubility of about 80%, was catalyzed the same way, then applied to a concrete block and dried. The so-filled block was then brushed with the same kind of semigloss polyester enamel under substantially the same conditions. The cure of the polyester was slow, its surface hardness was deficient, and the sheen of the surface was distinctly not uniform. Some evidence of incipient wrinkling was also noted in this coating system.

Example 3

To a block coated in the manner shown in Example 1 the air-uninhibited gloss polyester enamel was applied by brush to give a film between 10 and 20 mils in thickness. It was cured in the manner of the polyester film of Example 2. It gave a similarly durable film that had a higher gloss than the wax-protected polyester of Example 2.

By way of contrast emulsion subcoatings were formulated and catalyzed like that of Example 1, except that in one case a polyvinyl acetate homopolymer having monomer solubility of 84% was used and in another case a polyvinyl acetate homopolymer having monomer solubility of 59.3% was used. These subcoatings were applied to concrete blocks and dried. When they were coated with the same kind of air uninhibited gloss polyester enamel under substantially the same conditions softer films resulted, showing interference with the polyester cure. Additionally the films never reached expected hardness and were, therefore, unsatisfactory.

When a similar experiment was performed using polyvinyl acetate homopolymers having monomer solubility in one case of 37% and in another case of 31.5%, the gloss polyester enamel films applied thereover cured in satisfactory fashion.

I claim:
1. In a process for curing a coating film comprising an unsaturated polyester dissolved in a polymerizable monomer in contact with a catalyzed subcoating containing film-forming binder on a substrate, the improvement which comprises: applying to the substrate a subcoating in which the binder consists essentially of an aqueous emulsion of synthetic resin solids, said synthetic resin solids consisting essentially of vinyl acetate units and having monomer solubility not substantially in excess of about 50%, and a free radical catalyst capable of curing said polyester-containing coating film; thereafter applying said polyester-containing coating film directly over said subcoating; and allowing said coating film to set by the action of said catalyst in said subcoating.

2. The process of claim 1 wherein said subcoating is permitted to dry before applying said polyester-containing coating material thereover.

3. The process of claim 1 wherein said polyester-containing coating material is applied before the subcoating is dry.

4. The process of claim 1 wherein said aqueous emulsion contains about 20–200% of an inert filler based on the initial volume of the emulsion, and said filler contains not substantially more than about 1% of free alkaline impurities and active transitional elements, measured as their oxides.

5. The process of claim 4 wherein said filler is silica sand containing not substantially more than about ½% of iron as $Fe_2O_3$, said sand is used in a proportion of about 80–120% based on the initial volume of the emulsion, the emulsion contains about 20–60% by weight of polyvinyl acetate homopolymer solids as said synthetic resin solids having monomer solubility not substantially in excess of about 35%, and the catalyst is a peroxide catalyst.

References Cited by the Examiner
UNITED STATES PATENTS

| | | | |
|---|---|---|---|
| 2,597,872 | 5/52 | Iler | 260—41 |
| 2,751,775 | 6/56 | Sergovic | 117—123 |
| 2,817,619 | 12/57 | Bickel et al. | 117—72 X |
| 2,908,602 | 10/59 | Collardeau et al. | 117—72 X |

FOREIGN PATENTS 1,025,302  2/58  Germany.

OTHER REFERENCES

"Vinyl Resins," Smith, Reinhold Publishing Co., 1958 (pages 23 to 42).

RICHARD D. NEVIUS, *Primary Examiner.*